United States Patent
Mayer et al.

(10) Patent No.: US 12,260,174 B2
(45) Date of Patent: Mar. 25, 2025

(54) DETECTION OF ALTERED DOCUMENTS

(71) Applicant: MoneyThumb LLC, Encinitas, CA (US)

(72) Inventors: Ralph Mayer, Encinitas, CA (US); Erik Giles, Encinitas, CA (US)

(73) Assignee: MONEYTHUMB, INC., Encinitas, CA (US)

( * ) Notice: Subject to any disclaimer, the term of this patent is extended or adjusted under 35 U.S.C. 154(b) by 0 days.

(21) Appl. No.: 18/027,855

(22) PCT Filed: Sep. 21, 2021

(86) PCT No.: PCT/US2021/051363
§ 371 (c)(1),
(2) Date: Mar. 22, 2023

(87) PCT Pub. No.: WO2022/066666
PCT Pub. Date: Mar. 31, 2022

(65) Prior Publication Data
US 2023/0359815 A1    Nov. 9, 2023

Related U.S. Application Data

(60) Provisional application No. 63/081,453, filed on Sep. 22, 2020.

(51) Int. Cl.
*H04L 9/00*        (2022.01)
*G06F 40/194*    (2020.01)

(52) U.S. Cl.
CPC ................... *G06F 40/194* (2020.01)

(58) Field of Classification Search
CPC ..................................... G06F 40/194
(Continued)

(56) References Cited

U.S. PATENT DOCUMENTS 10,395,772 B1     8/2019  Lucas et al.
10,621,346 B1 *   4/2020  Singh ............... H04L 9/3239
(Continued)

OTHER PUBLICATIONS

Notification of Transmittal of International Preliminary Report for PCT/US2021/051363 mailed on Apr. 6, 2023, 6 pages.
(Continued)

*Primary Examiner* — Christopher J Brown
(74) *Attorney, Agent, or Firm* — Procopio, Cory, Hargreaves & Savitch LLP (57) ABSTRACT

Analyzing and detecting altered documents is accomplished by accessing a target portable document format (PDF) document and extracting document content information from the target PDF document. The extracted document content information is analyzed to generate an intra document model for the target PDF document and then the extracted document content information is evaluated in accordance with the intra document model. Artifacts in the document content information are identified and an intra document score is determined based on the identified artifacts and their respective weightings. The document content information is evaluated again in accordance with one or more inter document models and artifacts in the document content information are again identified and an inter document score is similarly determined. A total alteration score is also determined based on the intra document score and inter document score.

17 Claims, 6 Drawing Sheets

(58) Field of Classification Search
USPC .......................................................... 713/176
See application file for complete search history.

(56) References Cited

U.S. PATENT DOCUMENTS

| | | | |
|---|---|---|---|
| 11,321,956 B1* | 5/2022 | Geng | G06V 30/414 |
| 2006/0017959 A1* | 1/2006 | Downer | G07D 7/004 |
| | | | 358/1.14 |
| 2007/0220614 A1 | 9/2007 | Ellis et al. | |
| 2008/0091954 A1 | 4/2008 | Morris et al. | |
| 2011/0197121 A1* | 8/2011 | Kletter | G06F 40/194 |
| | | | 715/255 |
| 2016/0048528 A1 | 2/2016 | Vailaya et al. | |
| 2019/0122043 A1 | 4/2019 | Bala et al. | |
| 2020/0381108 A1* | 12/2020 | Ahmad | G06Q 40/12 |

OTHER PUBLICATIONS

International Search Report and Written Opinion for PCT/US2021/051363 mailed on Jan. 20, 2022, 19 pages.
European Patent Office, Supplementary European Search Report issued in EP21873293.1, dated Sep. 10, 2024, 12 pages.
Cross, Jesse S et al., "Deep PDF Parsing to Extract Features for Detecting Embedded Malware", Sep. 1, 2011 (Sep. 1, 2011), XP093199454, Sandia Report, SAND2011-7982, Unlimited Release, Printed Sep. 2011, Retrieved from the Internet: URL: https://www.osti.gov/servlets/purl/1030303, 20 pages.
Charles Smutz, "Malicious PDF Detection Using Metadata and Structural Features", Proceedings of the 28th Annual Computer Security Applications Conference, Dec. 3, 2012 (Dec. 3, 2012), pp. 239-248, XP093199519, Retrieved from the Internet: URL: https://cs.gmu.edu/media/techreports/GMU-CS-TR-2012-5.pdf, 16 pages.
Nedim Šrndić and Pavel Laskov, "Detection of Malicious PDF Files Based on Hierarchical Document Structure", Proceedings of the 20th Annual Network & Distributed System Security Symposium, Jan. 1, 2013 ( Jan 1. 2013), XP093199528, Retrieved from the Internet: URL: https://www.ndss-symposium.org/wp-content/uploads/2017/09/12_3_0. pdf, 16 pages.
Kittilsen Jarle, "Detecting malicious PDF documents", Jan. 12, 2011, XP093199533, Retrieved from the Internet: URL: https://ntnuopen.ntnu.no/ntnu-xmlui/bitstream/handie/11250/144014/Jarle%20Kittilsen.pdf?sequence=1, 132 pages.

* cited by examiner

DETECTION OF ALTERED DOCUMENTS

BACKGROUND

Field of the Invention

The present disclosure is generally directed to fraud detection and more particularly related to digital forensic analysis of documents generated by a third party.

Description of the Related Art

In the financial industry, bank statements and other financial statements are often used by loan underwriters to evaluate the credit worthiness of the applicant and ultimately whether to approve a loan or grant credit. Often times, a portion of the evaluation of an applicant relies on verification of sufficient cash flow to repay the loan. However, such verification of credit worthiness and sufficient cash flow is typically based on bank statements and other financial statements that are subject to alteration. Across the financial sector, up to 1% of such statements that are submitted in support of an applicant have been altered in some way and in the most egregious cases, the statements may be entirely fictious. Such alteration is becoming increasingly common with the availability of powerful software tools that allow people to edit PDF files and alter text and values. Such alteration is also becoming increasingly common with the availability of powerful word processing software that allows the creation entirely fake documents that can be converted or printed to a PDF format. Similarly, there are web sites that also provide tools to create entirely fake documents that purport to originate from well known sources such as banks and other financial institutions.

One proposed solution has been to obtain authorization (e.g., username and password information) from the applicant to access to the applicant's financial accounts to obtain authentic statements in order to evaluate the credit worthiness of the applicant. However, obtaining such access is time consuming, cumbersome, costly, and involves serious privacy and/or legal liability concerns. Consequently, applicants are reluctant to provide login and password information and financial industry players are reluctant to receive it.

SUMMARY

Accordingly, systems, methods, and non-transitory computer-readable media are disclosed to reliably detect altered documents so that they can be carefully scrutinized during the evaluation of an applicant or candidate that provided the documents.

In an embodiment, altered documents are detected by accessing a target portable document format (PDF) document and extracting document content information from the target PDF document. The extracted document content information is analyzed to generate an intra document model for the target PDF document and then the extracted document content information is evaluated in accordance with the intra document model. One or more intra document artifacts in the document content information are identified and an intra document score is determined based on the identified artifacts and their respective weightings. The document content information is also evaluated a second time (or more) in accordance with one or more inter document models and one or more inter document artifacts in the document content information are identified and an inter document score is similarly determined. A total alteration score is subsequently determined based on one or more of the intra document score and inter document score. This method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for detecting altered documents. For example, altered documents are detected by analyzing the PDF content stream of the target PDF document and generating an intra document model for the target PDF document. The target PDF document content is then evaluated in accordance with the intra document model to identify one or more intra document artifacts and an intra document score is determined based on the identified artifacts and their respective weightings. The target PDF document content is then evaluated again in accordance with an inter document model to identify one or more inter document artifacts and an inter document score is similarly determined. A total alteration score is subsequently determined based on one or more of the intra document score and inter document score.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
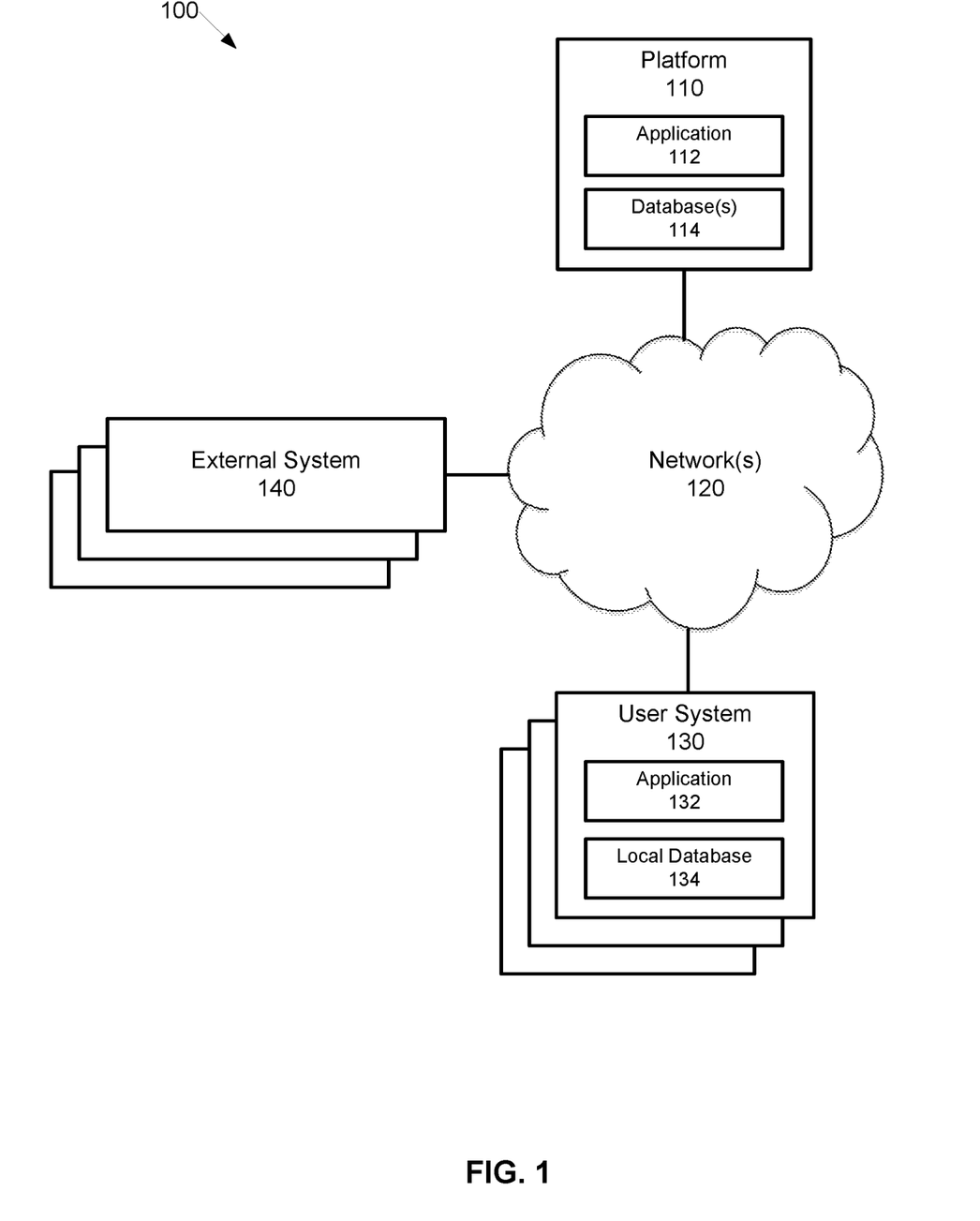
FIG. 1 illustrates an example infrastructure, in which one or more of the processes described herein, may be implemented, according to an embodiment.

FIG. 1 illustrates an example infrastructure of a system 100 in which one or more of the disclosed processes may be implemented, according to an embodiment. The infrastructure may comprise a platform 110 (e.g., one or more servers)

which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114, which may be implemented as a simple data storage area/device or a sophisticated database system such as a relational database with controlling software. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, servers, desktop computers, laptop computers, tablet computers, smart phones or other mobile phones, game consoles, televisions, set-top boxes, electronic kiosks, point-of-sale terminals, Automated Teller Machines, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130, for example, requests received via an API using standard HTTPS.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the processes, methods, or functions of the application described herein.

1.2. Operation

In operation, the system 100 facilitates implementation of detecting altered documents. The platform 110 supports an application 112 that operates to analyze target PDF documents and identify altered documents. Various examples of known authentic and known altered documents may be stored in database 114 and these examples may be added to over time to provide sets of known documents for training of predictive models that are tailored to support the application 112 when analyzing target PDF documents. Examples may include the target PDF documents themselves or a representation of such documents, for example metadata corresponding to a target PDF. Libraries of such known authentic and known altered documents may be identified by the platform 110 and added to the set of example documents or may be obtained from one or more externals systems 140.

In one aspect, user system 130 may be located at a financial institution that is evaluating an applicant. As part of the evaluation process, the applicant may provide one or more PDF documents. The user system 130 may access these PDF documents and provide them to the platform 110 via the network 120. At the platform 110, the application 112 is configured to analyze each target PDF and generate an alteration score representing a likelihood that the target PDF document has been altered. The financial institution can then use the alteration score in accordance with its own risk tolerance to complete its evaluation of the applicant.

1.3. Example Processing Device

Figure 2:
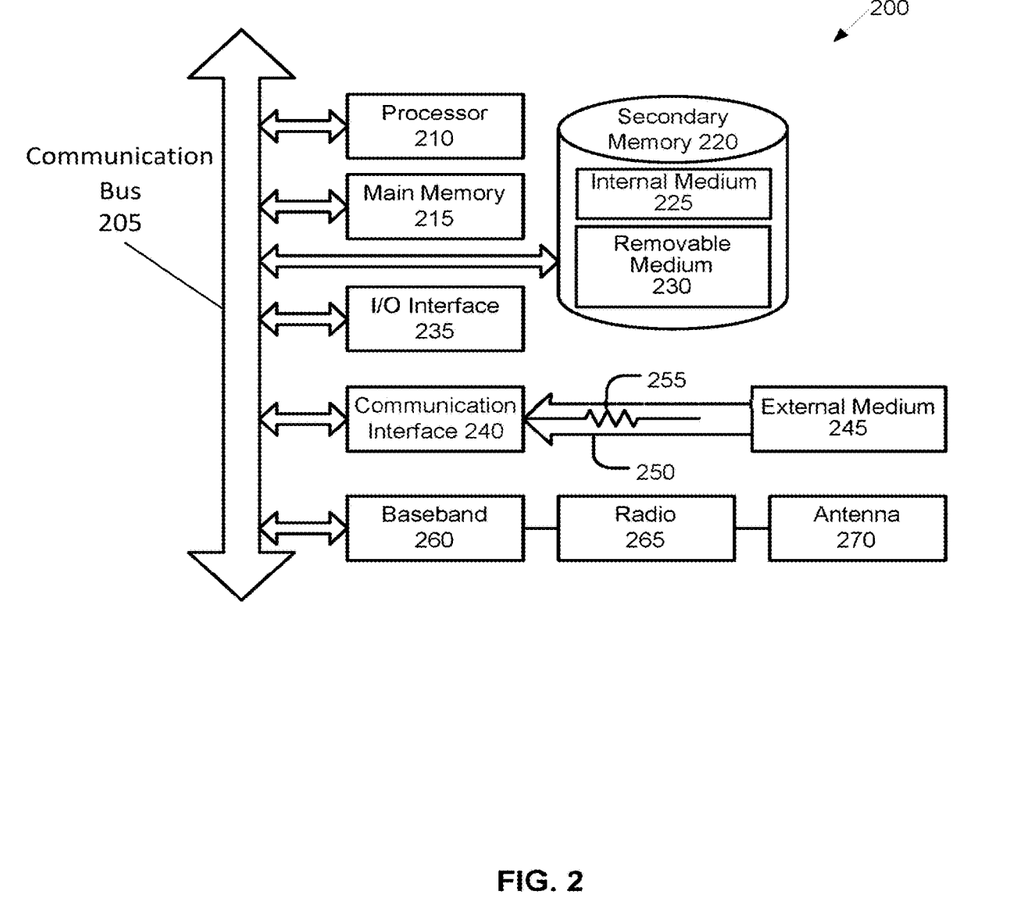
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Corei7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

2. Process Overview

Embodiments of processes for detecting altered documents will now be described in detail. It should be understood that the described processes may be embodied in one or more software modules that are executed by one or more hardware processors (e.g., processor 210), for example, as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Generating Intra Document Model

Figure 3:
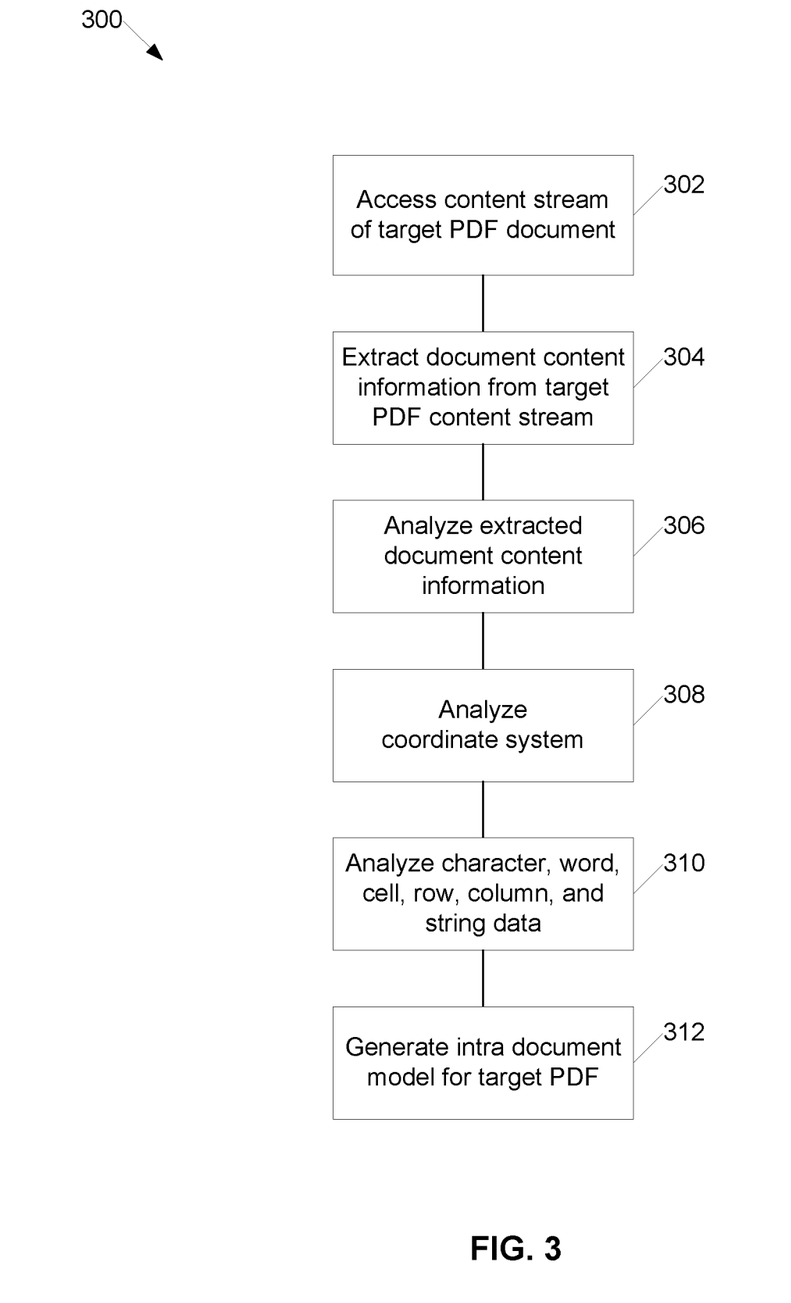
FIG. 3 illustrates an example process for analyzing a target PDF document to generate an intra document model for the target PDF document, according to an embodiment.

FIG. 3 illustrates an example process 300 for analyzing a target PDF document to generate an intra document model for the target PDF document, according to an embodiment. Process 300 may be carried out by a system or apparatus as previously described with respect to FIGS. 1 and 2. Initially at 302, the system accesses a target PDF document and its corresponding PDF content stream. For example, a target PDF may be a PDF document provided by an applicant in support of an application for a loan or other transaction.

Next, at 304 the system extracts document content information from the target PDF content stream. In one aspect, the system reads and parses the target PDF content stream to identify all of the PDF operators (also referred to as "PDF commands" or "commands") and PDF data objects included in the target PDF content stream. For example, there are approximately 100 PDF commands and eight data objects that may be included in the target PDF content stream. The data objects can be one or more of: boolean values, integer/real numbers, strings, names, arrays, dictionaries, streams, and the null object. The system reads the PDF content stream for each page of the target PDF document and identifies each PDF command that is present. All of the PDF commands may be employed in the analysis, however, PDF commands that are of particular interest include those PDF commands that are used to position text strings and position individual characters within a text string. The system examines such commands in detail to accumulate a list of all text on each page of the target PDF.

In a PDF content stream, a string may be made up of a single character, a series of multiple contiguous characters that form a portion of a word, a series of multiple contiguous characters that form an entire word, a series of multiple contiguous characters that form multiple words with spaces, and so forth up to multiple lines of text such as a paragraph or a table of numbers and text.

When extracting the document content information from the PDF content stream, the system stores information for each character found in a string. Such information may include details about how the individual character is specified in the PDF content stream. For example, the specification of a character in the PDF content stream may include the X,Y value of the position at the start of the string in which the character is found, the specific PDF command that is used to specify the text string, whether or not each individual character in the string has its own specific X,Y value, the font of the individual character, and the sequential position of the string in which the character is found within the entire PDF content stream. Accordingly, for each character in the target PDF document, the system extracts a large amount of information about the character as document content information. Note that a character may be any alphanumeric character including special characters and otherwise invisible characters such as spaces and line breaks and the like.

When extracting the document content information from the PDF content stream, the system stores the X,Y information for each character and string. Strings in a PDF document each have relative positions (e.g., top, bottom, left, right) and strings are further organized into objects such as words, cells, and rows. In an aspect, a word is a string of characters without spaces, a cell is one or more words, and a row is a series of characters or a series of words or a series of cells or any combination of characters, words, and cells that all have the same alignment for the bottom of the characters that make up the row. Also, PDF files have an X,Y coordinate system that is typically measured in typographical points, where a point is equal to about 0.353 mm. In this fashion, each PDF data object can be associated with a precise X,Y location.

In one example, the system may extract a first string such as "01/20/2020" and also extract a second string such as "Jan. 2, 2020." The first string has a single word while the second string has three words. Moreover, each of these two strings may be considered a single cell in the PDF document such that the first cell has one word and the second cell has three words.

When extracting the document content information from the PDF content stream of the target PDF document, the system advantageously performs pattern matching to identify data objects that correspond to dates, numbers, currency values and the like. In one aspect, strings, characters, rows, cells, and words that are not identified (e.g., dates, numbers, currency values and the like) are considered to be description.

When extracting the document content information from the PDF content stream of the target PDF document, the system also identifies columns, which are typically made up of multiple cells of the same type. Columns typically include like data values such as dates or numbers and the like and the cells of a column are generally aligned in the X dimension. For example, dates are typically left aligned while numbers and currency values are typically right aligned or aligned by decimal point. Of course, many variations of alignment are possible and the system is configured to extract the document content information from the PDF content stream of the target PDF document and identify the columns and the type of alignment that was used to generate the target PDF document. Additionally, when extracting the document content information from the PDF content stream of the target PDF document, the system also identifies a format for certain data objects. For example, as mentioned above, a date may have a first format such as "01/20/2020" or it may have a second format such as "Jan. 2, 2020." All of this information is extracted by the system at 304 as part of the document content information.

At 306, the system analyzes the extracted document information. When analyzing the document content information, the system is configured to determine what columns are present and what formats are employed for data objects such as dates and numbers and currency, etc.

At 308, the system analyzes the coordinate system of the target PDF and is configured to identify position information for the various data objects in the target PDF. For example, the absolute and relative X,Y positions of each character, word, cell, row, and string in the target PDF is identified and stored.

At 310 the system analyzes the various character, word, cell, row, column, and string data to associate this data with characteristics such as font type and font size and text color and the like. Furthermore, the system is also configured to identify and store the type of container(s) that each character, word, cell, row, column, and string belongs to.

In one aspect, the system is configured to identify columns in the document content information and these columns are employed to generate a model of the target PDF document. For example, the system is configured to identify macro structural elements in the target PDF document such as sections. For example, in a bank statement PDF document, sections may include a credits sections, a debits section, and a checks section. These sections may or may not include features such as titles and header rows and a layout that describes the columns in the section. In another example, various sections of a tax form can be identified by the system and the tabular data included in each section can be associated with a particular column under a heading.

In summary, the system is configured to receive a target PDF file and open the target PDF file and read the PDF content stream and extract and analyze document content information. The result is a comprehensive set of document content information for the target PDF that includes coordinate system information for the various data objects in the target PDF document and also includes an identification of columnar data along with information about the organization of the content of the target PDF document and how atomic data elements such as individual characters are grouped together to form words, cells, rows, strings, and how these data elements are positioned. At 312, all of this information is assembled together into a comprehensive document model for the target PDF.

2.2. Determine Intra Document Score

Figure 4:
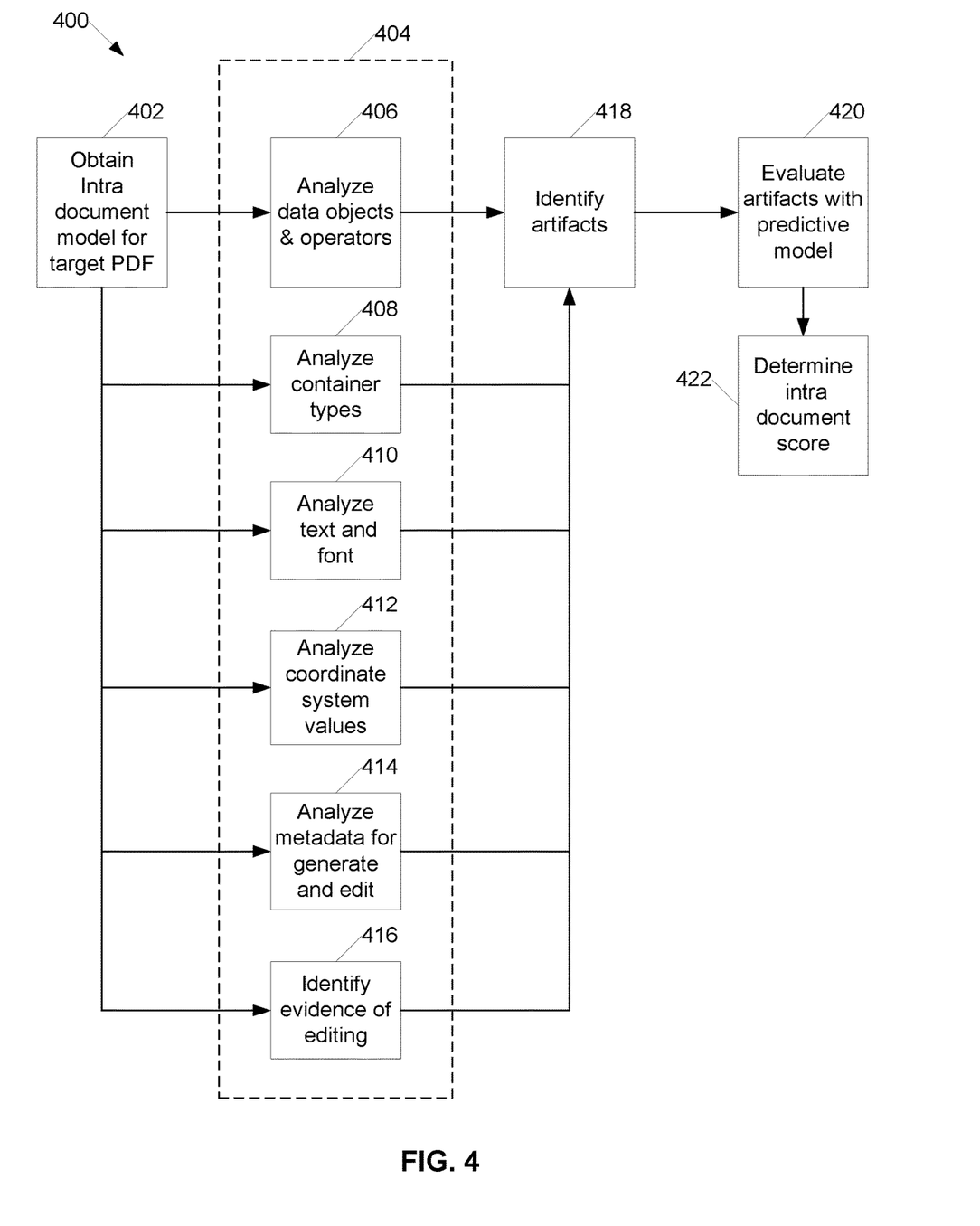
FIG. 4 illustrates an example process for determining an intra document score for a target PDF document, according to an embodiment.

FIG. 4 illustrates an example process 400 for determining an intra document score for a target PDF document, according to an embodiment. Process 400 may be carried out by a system or apparatus as previously described with respect to FIGS. 1 and 2. Initially at 402, the system obtains the intra document model for the target PDF. This may be done, for example, in accordance with process 300 previously discussed in connection with FIG. 3.

Next, at 404 the system analyzes the intra document model. During the analysis, the system is configured to scrutinize the document model using many different types of analysis and these can be done in any order or in parallel. Depending on the content of the target PDF file, some types of analysis may or may not be appropriate.

At 406 the system analyzes the data objects and PDF commands that are used in the PDF document. As part of the analysis, the system may identify discrepancies in the type of PDF command that is used throughout the document for positioning a data object. For example, in most cases, the target PDF may position the content of each row of a column by using a PDF command to position the cell that contains that content. But in one instance (e.g., one row of the column) the target PDF may position the content of a single row of the column by using a different PDF command to position each character that makes up the content of that row.

Additionally, if a particular type of PDF command is used to position strings is regularly used throughout the target PDF document but then in one instance a different type of command is use, the system is configured to identify an artifact. For example, there are at least three different types of PDF commands that can be used to position text strings and may result in text being displayed. These can include PDF commands that display text using a single text string, or using an array of text strings that are displayed one per line, or using an array of text strings that are displayed with a new position specified for each string in the array.

At 408 the system analyzes the container types to identify anomalies and discrepancies. In one aspect, if a particular type of container (e.g., word, cell, row, string, etc.) is regularly used throughout the target PDF document but then in one instance a different type of container is use, the system is configured to identify an artifact. Additionally, the system is configured to analyze the structure of data values, for example, a number or a currency value. In one aspect, a currency value may be created using one string or multiple strings. Typically, a single target PDF document will use the same structure for all values of the same type such as a currency value. Accordingly, the system is configured to identify an artifact when, for example, some currency values use a first structure (e.g., one string) and other currency values use a second structure (e.g., multiple strings).

At 410 the system analyzes the text characteristics and the font characteristics to identify anomalies and discrepancies. For example, the system is configured to analyze the text characteristics such as italics, underline, bold, color, subscript, superscript, and highlighting just to name a few. The system is also configured to analyze the font name and the font size for the text in the target PDF document.

Additionally, the system is configured to analyze the text characteristics and font characteristics for the various containers within the target PDF document. For example, in a column of data values, the system analyzes the text characteristics and font characteristics to determine if some rows of the table have differences in the text characteristics and font characteristics. If such differences are detected, the system is configured to identify an artifact. Additionally, when a single value (e.g., a currency value) is created using multiple strings and there are at least two different fonts used in the different strings that make up the single value, the system is configured to identify an artifact. Additionally, the system is configured to determine whether the font being used is a fixed width font or a variable width font. For example, financial institutions generally use a fixed width font for numbers so that the data values in each row of a column are in vertical alignment.

At 412 the system analyzes the coordinate system within the target PDF document and the corresponding positioning of data objects and their respective containers. In one aspect, columnar data typically is aligned to a particular X position. For example, number values may be aligned to a specific X position for the right most character or may be aligned to a specific X position of a decimal point. Similarly, date values may be aligned to a specific X position of a leftmost character or a rightmost character. In one aspect, as the system checks for alignment of columns, the system is checking whether data objects that should be at the same position are indeed at that precise position. If the actual position differs from the expected position the system uses an evaluation to determine whether the differences appear to be from a PDF generation program, or the result of editing. The evaluation may include statistical properties such as the magnitude, mean, median, and standard deviation of those differences, and the number of unique and repeating X positions.

Figure 5:
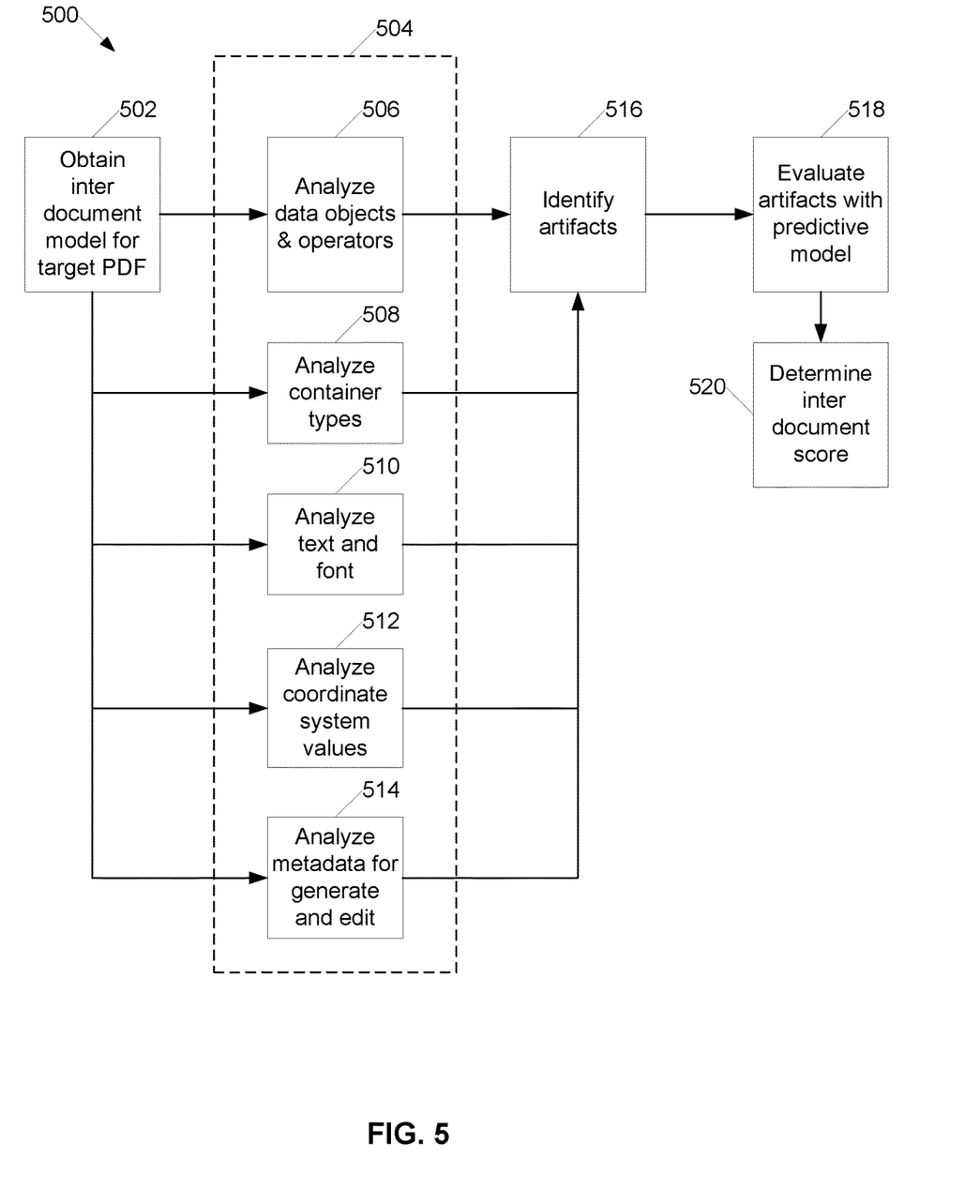
FIG. 5 illustrates an example process for determining an inter document score for a target PDF document, according to an embodiment.

In one aspect, the starting X position is not always identical and may instead have a small (e.g., 2-10) number or large (10+) number of different values that each differ by the same small amount. Or there may be a small number or large number of different values that each differ by what appears to be a random amount. To account for these types of different starting X position values, the system is configured to calculate intra document alignment metrics during the process 400 for determining an intra document score for a target PDF document. Advantageously, these intra document alignment metrics can be employed in the inter document score process 500 when evaluating a target PDF document. For example, intra document alignment metrics may include ranges of values and ratios of recurrences of starting X position values and in the inter document score process, those metrics may be compared to normalized or averaged metrics derived from a set of known authentic documents, e.g., a set of known authentic for a particular bank.

Additionally, the system is configured to analyze the location of data values in the PDF content stream and compare that to the position of the same data values with respect to the coordinate system. For example, the position may be the relative X or Y position or the relative X,Y position. Notably, the location of a data value in the PDF content stream is not directly related to the position of the same data value on the page of the target PDF. Whether a text string that is below another similar string was sequentially after that string in the PDF Stream. This can only be applied to values that are not the first one in a column, so context is important.

At 414 the system analyzes details related to the creation of the target PDF document and any editing of the target PDF document. For example, the name of the software tool that was used for creating or editing the target PDF may be included in the document model. In one aspect, the system may maintain a ranking of software tools and how commonly various tools are used for altering PDF documents or creating entirely false PDF documents and if such a tool is identified in the target PDF, the system may be configured to identify an artifact. Additionally, a software tool may insert a flag or some other indicator into the PDF content stream that identifies the software tool as being used to edit the target PDF file and if such an edit flag is identified in the target PDF file, the system may be configured to identify an artifact.

In one aspect, the system is configured to identify text or an image or another type of data object container that has been inserted on top of text, or an image or another type of data object container. For example, text may be placed over the top of text to obscure the original text or alter the original text. Such text may include numbers and letters and the nature of such text may, e.g., be designed to change the meaning of a transaction or change account owner information, etc.

At 416 the system analyzes the intra document model to identify any other evidence of editing or alteration of the target PDF file or of fabrication of the content of the target PDF file. For example, the system is configured to determine that the target PDF file is a bank statement and when the target PDF file is a bank statement they system is configured to identify a starting balance for the account and an ending balance for the account and a series of transactions. The system is also configured to calculate an ending balance for the account based on the starting balance and the series of transactions. If the system determines a calculated ending balance that is not the same as the ending balance in the target PDF file, the system is configured to identify the discrepancy as an artifact. Other types of statement reconciliation can also be performed by the system to identify discrepancies that are identified as artifacts. In another example, the system is configured to analyze transaction dates set forth in the target PDF and compare those dates to the target PDF creation date to identify any discrepancies. Such discrepancies may advantageously be identified as an artifact.

Next, at 418 the system identifies one or more artifacts based on the analysis of the intra document model and at 420 the system evaluates the artifacts one or more predictive models. The one or more predictive models advantageously can be trained on a set of known authentic target PDFs and a set of known altered target PDFs. These sets of target PDFs can continuously increase in number to improve the training of the predictive models.

Finally, at 422 the system is configured to determine an intra document score for the target PDF based on the evaluation of the one or more artifacts using the one or more predictive models. In one aspect, the intra document score is a confidence metric representing the likelihood that the target PDF file has been altered. For example, the intra document score may be a number between 0 and 100 where a score of 99 represents an extremely high likelihood that the target PDF document has been altered and a score of 1 represents an extremely low likelihood that the target PDF document has been altered.

2.3. Determine Inter Document Score

FIG. 5 illustrates an example process 500 for determining an inter document score for a target PDF document, according to an embodiment. Process 500 may be carried out by a system or apparatus as previously described with respect to FIGS. 1 and 2. Initially at 502, Initially at 502, the system obtains the inter document model for the target PDF. This may be done, for example, by accessing a local database storing the inter document model such as database 114 of the platform 110 previously described with respect to FIG. 1. In one aspect, the system may obtain the inter document model from an external system 140 such as previously described with respect to FIG. 1.

Next, at 504 the system analyzes the inter document model. During the analysis, the system is configured to scrutinize the document model using many different types of analysis and these can be done in any order or in parallel. Depending on the content of the target PDF file, some types of analysis may or may not be appropriate.

Importantly, the inter document model represents an accumulation of the analysis of many known authentic PDF documents. For example, the library of known authentic PDFs may include tens or thousands of known authentic PDF documents produced by a particular third party. As such the inter document model includes details related to the consistencies found across many examples of know authentic PDF documents. Accordingly, the tolerances involved when analyzing a target PDF against the inter document model can be extremely small. For example, the system may be configured to look for exact matches in font and X position of certain data objects (e.g., a logo or a column heading). However, in some circumstances, the target PDF may be received as a scanned paper document processed using optical character recognition to determine the content of the target PDF file. In such circumstances, the tolerances may be considerably relaxed when determining the inter document score.

At 506 the system analyzes the data objects and PDF commands that are used in the PDF document. For certain data objects (e.g., the name of the third party that allegedly produced the target PDF document), the system is configured to identify the X position where the data object is located. Additional analysis of column numbers, font names and font sizes may be also be included for each data object. In one aspect, a specific format of the date is considered when the inter document model indicates that the third party that allegedly produced the target PDF document consistently uses the same date format such as one of the MM-DD-YYYY or MM/DD/YYYY or MMM DD, YYYY formats. Similarly for currency values, the system is configured analyze the target PDF file and look for a specific type of currency value (e.g., amount, credit, debit, balance, check amount), and/or a specific number of digits used in the currency value, and/or a certain prefix (e.g., minus sign (-) or dollar sign ($)).

Also, as part of the analysis, the system may identify discrepancies in the type of PDF command that is used throughout the document for positioning a data object. For example, in most cases, the target PDF may position the content of each row of a column by using a PDF command to position the cell that contains that content. But in one instance (e.g., one row of the column) the target PDF may position the content of a single row of the column by using a different PDF command to position each character that makes up the content of that row.

Additionally, if a particular type of PDF command is used to position strings is regularly used throughout the target PDF document but then in one instance a different type of command is use, the system is configured to identify an artifact. For example, there are at least three different types of PDF commands that can be used to position text strings and may result in text being displayed. These can include PDF commands that display text using a single text string, or using an array of text strings that are displayed one per line, or using an array of text strings that are displayed with a new position specified for each string in the array.

At 508 the system analyzes the container types to identify anomalies and discrepancies. In one aspect, if a particular type of container (e.g., word, cell, row, string, etc.) is regularly used throughout the target PDF document but then in one instance a different type of container is use, the system is configured to identify an artifact. Additionally, the system is configured to analyze the structure of data values, for example, a number or a currency value. In one aspect, a currency value may be created using one string or multiple strings. Typically, a single target PDF document will use the same structure for all values of the same type such as a currency value. Accordingly, the system is configured to identify an artifact when, for example, some currency values use a first structure (e.g., one string) and other currency values use a second structure (e.g., multiple strings).

At 510 the system analyzes the text characteristics and the font characteristics to identify anomalies and discrepancies. For example, the system is configured to analyze the text characteristics such as italics, underline, bold, color, subscript, superscript, and highlighting just to name a few. The system is also configured to analyze the font name and the font size for the text in the target PDF document.

Additionally, the system is configured to analyze the text characteristics and font characteristics for the various containers within the target PDF document. For example, in a column of data values, the system analyzes the text characteristics and font characteristics to determine if some rows of the table have differences in the text characteristics and font characteristics. If such differences are detected, the system is configured to identify an artifact. Additionally, when a single value (e.g., a currency value) is created using multiple strings and there are at least two different fonts used in the different strings that make up the single value, the system is configured to identify an artifact. Additionally, the system is configured to determine whether the font being used is a fixed width font or a variable width font. For example, financial institutions generally use a fixed width font for numbers so that the data values in each row of a column are in vertical alignment.

At 512 the system analyzes the coordinate system within the target PDF document and the corresponding positioning of data objects and their respective containers. In one aspect, columnar data typically is aligned to a particular X position. For example, number values may be aligned to a specific X position for the right most character or may be aligned to a specific X position of a decimal point. Similarly, date values may be aligned to a specific X position of a leftmost character or a rightmost character.

Additionally, the system is configured to analyze the location of data values in the PDF content stream and compare that to the position of the same data values with respect to the coordinate system. Notably, the location of a data value in the PDF content stream is not directly related to the position of the same data value on the page of the target PDF. Whether a text string that is below another similar string was sequentially after that string in the PDF Stream. This can only be applied to values that are not the first one in a column, so context is important.

Additionally, the system is configured to analyze the content of the target PDF including key information such as the account owner name, the account owner address, the account number (or other identifying information), and the ending date for the statement period.

At 514 the system analyzes details related to the creation of the target PDF document and any editing of the target PDF document. For example, the name of the software tool that was used for creating or editing the target PDF may be included in the document model. In one aspect, the system may maintain a ranking of software tools and how commonly various tools are used for altering PDF documents or creating entirely false PDF documents. The system may also maintain a list of software tools that are typically used to generate PDF documents by certain third parties and if the target PDF document includes the name of the actual generation tool used to generate the target PDF document and if the actual generation tool matches the expected generation tool, this may be analyzed by the system as a factor in favor of lowering the intra document score. Conversely, if the actual generation tool used to generate the target PDF document disagrees with the expected generation tool, the system may be configured to identify an artifact. Additionally, a software tool may insert a flag or some other indicator into the PDF content stream that identifies the software tool as being used to edit the target PDF file and if such an edit flag is identified in the target PDF file, the system may be configured to identify an artifact.

Next, at 516 the system identifies one or more artifacts based on the analysis of the inter document model and at 518 the system evaluates the artifacts one or more predictive models. The one or more predictive models advantageously can be trained on a set of known authentic target PDFs and a set of known altered target PDFs. These sets of target PDFs can continuously increase in number to improve the training of the predictive models.

Finally, at 520 the system is configured to determine an inter document score for the target PDF based on the evaluation of the one or more artifacts using the one or more predictive models. In one aspect, the inter document score is a confidence metric representing the likelihood that the target PDF file has been altered. For example, the inter document score may be a number between 0 and 999 where a score of 995 represents an extremely high likelihood that the target PDF document has been altered and a score of 5 represents an extremely low likelihood that the target PDF document has been altered.

2.4. Determine Alteration Score

Figure 6:
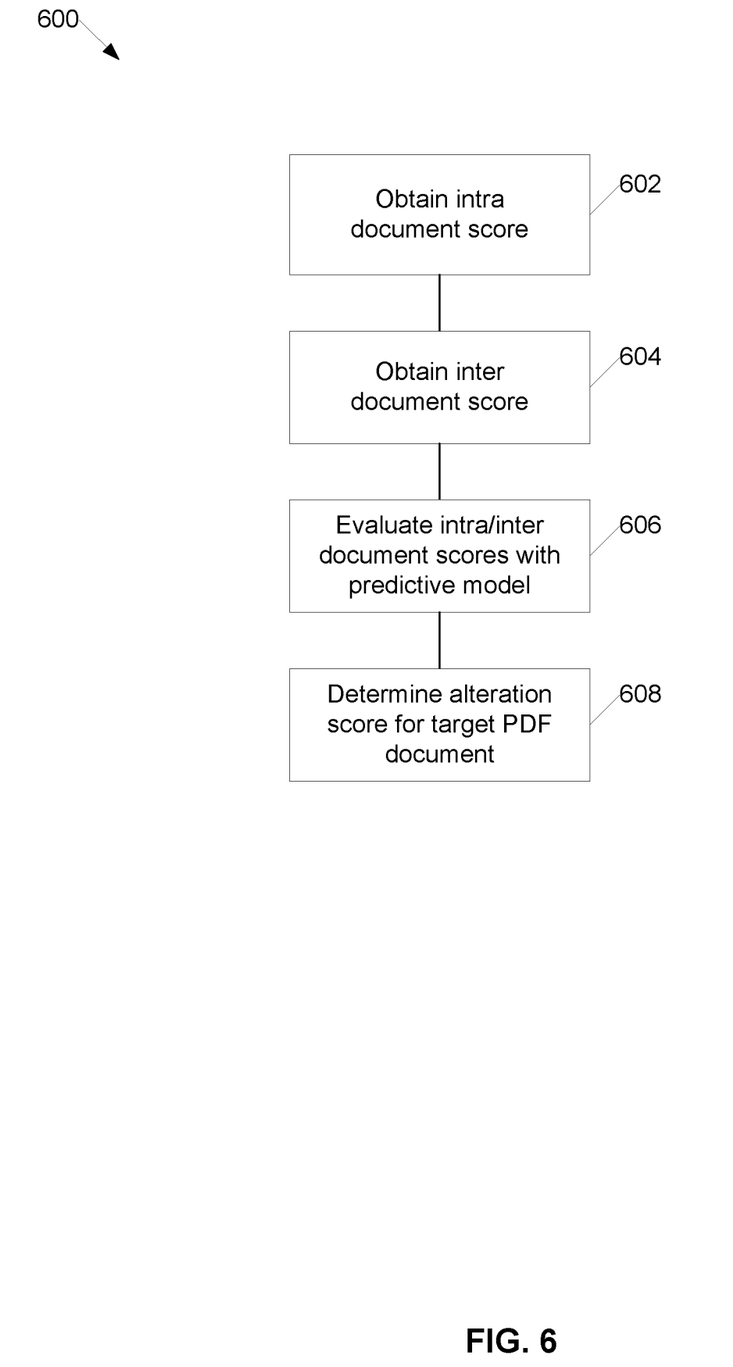
FIG. 6 illustrates an example process for determining an alteration score for a target PDF document, according to an embodiment.

FIG. 6 illustrates an example process 600 for determining an alteration score for a target PDF document, according to an embodiment. Process 600 may be carried out by a system or apparatus as previously described with respect to FIGS. 1 and 2. Initially at 602, the system obtains the intra document score for the target PDF. This may be done, for example, in accordance with process 400 previously discussed in connection with FIG. 4. Next, at 604, the system obtains the inter document score for the target PDF. This may be done, for example, in accordance with process 500 previously discussed in connection with FIG. 5.

At 606, the system evaluates the intra document score and the inter document score together. In one aspect, the system employs a predictive model that analyzes the various artifacts supporting the intra document score in combination with the various artifacts supporting the inter document score. For example, the presence or absence of certain intra document artifacts in view of the presence or absence of certain inter document artifacts may impact the overall alteration score.

In one aspect, all the artifacts (e.g., non-conforming features) identified when determining the intra document score and identified when determining the inter document score are counted and put into the predictive model to generate an alteration score. Some artifacts (for example, the presence of an edit flag) only need to occur once to produce a high alteration score, which is indicative of a high degree of confidence that the target PDF file has been altered. Other artifacts may need to occur multiple times and/or in conjunction with other artifacts in order to raise the score. For example, one data object with a misaligned X value would not necessarily increase the alteration score by a significant amount. Advantageously, the predictive model can be trained by a library of known authentic PDF documents and a library of know altered PDF documents to facilitate determining alteration scores with a very high degree of confidence.

In one alternative aspect, the system may be configured to, in addition to determining the alteration score for the target PDF document, identify the specific artifacts in the target PDF that give rise to the alteration score. For example, if the target PDF has a high alteration score because several numbers in the document have been edited, the system may display an image of the target PDF file and highlight the numbers that have been edited. This may allow an operator to review the target PDF file during the evaluation of the applicant. In one aspect, if the applicant is seeking a loan from a financial institution and the target PDF is a bank statement from a third party bank and the edited values that are highlighted include the balance of all of the applicant's accounts at the third party bank, the alteration score in combination with the specific detail about what content was edited may facilitate further inquiry or a rapid conclusion to the evaluation.

3. Example Embodiments

In an aspect, a method of detecting altered documents is performed by a system such as platform 100 in combination with application 112 and data storage area 114. The system is configured to access a target PDF document and extract document content information from the PDF document. For example, the system may open the target PDF and extract the PDF content stream. The system is also configured to analyze the extracted document content information and generate an intra document model for the target PDF document and then evaluate the document content information in accordance with the intra document model to identify one or more first artifacts and determine an intra document score based on the identified one or more first artifacts. The one or more first artifacts may include inconsistencies in the structure or content of the target PDF document.

The system is also configured to evaluate the document content information in accordance with one or more inter document models and identify one or more second artifacts in the document content information based on the evaluation in accordance with the one or more inter document models. The one or more inter document models can be based on an analysis of known authentic and known altered documents. The system is also configured to determine an inter document score based on the identified one or more second artifacts and then determine an alteration score based on one or more of the intra document score and the inter document score. The intra document score and inter document score may be determined by weighting of the various first and second artifacts identified in the target PDF. In one aspect, the altered document score may identify the PDF document as having a high risk of being altered when the alteration score exceeds a predetermined threshold.

In one aspect, when determining an intra document score or an inter document score, an individual weight may be applied to each artifact. Additionally, the individual weight for an artifact may be increased or decreased based on the presence of one or more other artifacts. In this fashion, the presence of certain artifacts with each other may significantly increase or decrease the intra document score or the inter document score and consequently may also impact the overall alteration score for the target PDF. For example, a first weight may be applied to a first artifact when a different artifact is present and a second weight may be applied to the first artifact when the different artifact is not present. Similarly, a first weight may be applied to a first artifact when the first artifact is present one time and an increased weight may be applied to the first artifact for each additional time the first artifact is present. Such weighting can be applied to both first artifacts based on the intra document model and second artifacts based on the inter document model.

In one aspect, the intra document model may include a first data column having a first X location value corresponding to a horizontal position of a character in the PDF document. Accordingly, one of the one or more first artifacts may correspond to a character in the first column of data having an X location value that is different from the first X location value. For example, the character may be a leftmost character in the first column, or the character may be a decimal point, or the character may be a number adjacent a decimal point. Advantageously, data columns in known authentic documents routinely have the same X location value according to an internal coordinate system of the target PDF document. Thus, any deviation of the X value may signal the presence of an artifact.

In one aspect, the intra document model may include a plurality of dates, where each of the plurality of dates has a particular date format, for example "MM/DD/YYYY" or "MMM. DD, YYYY" or the like. Accordingly, one of the one or more first artifacts may correspond to one of the plurality of dates having a first date format and another of the plurality of dates having a second date format.

Other discrepancies may also rise to the level of an artifact. For example, the PDF content stream of the target PDF may include the name of a software program used to generate the PDF document and that software program may be a known software for altering PDF documents. Another item that may rise to the level of an artifact is the presence of an edit flag in the target PDF document.

In one aspect, one of the one or more first artifacts may correspond to a difference in font type or a difference in font size. For example, the PDF content stream may identify a contiguous string of characters including first and second characters that have a different font type or a different font size. Accordingly, one of the one or more first artifacts may correspond to the presence of this difference in font type or font size. Similarly, the PDF content stream may also identify a contiguous string of characters including first and second characters that have a different container type. Accordingly, one of the one or more first artifacts may correspond to the presence of this difference in container type for text. Additionally, the PDF content stream may also identify a data column with words on different rows including first and second rows that have words with different container types. Accordingly, one of the one or more first artifacts may correspond to the presence of this difference in container type for words in a column. Similarly, one of the one or more first artifacts may correspond to first and second words having different container positioning commands.

In one aspect, one of the one or more first artifacts may correspond to the order of a sequence of data values and their corresponding Y positions. For example, the document model may include a sequence of data values extracted from the PDF content stream that include a first data value and a second data value, where each data value has an associated position in the target PDF document. Accordingly one of the one or more first artifacts may correspond to a data value appearing later in the sequence of data values having a Y position in the target PDF document that precedes the Y position of a data value that appears earlier in the sequence of data values. Additionally, the intra document model may include a starting account balance, a plurality of transactions, and an ending account balance. Accordingly one of the one or more first artifacts may correspond to an ending account balance that does not agree with the starting account balance as modified by the plurality of transactions.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method of determining third party document authenticity comprising using at least one hardware processor to:

access a single instance of a portable document format (PDF) document for a first time, the PDF document generated by an unknown party, wherein the PDF document is asserted to be generated by a particular third party;

extract document content information from the PDF document comprising a plurality of PDF data objects and a plurality of PDF commands, wherein the plurality of PDF data objects include at least one text string and the plurality of PDF commands include at least one PDF command configured to position a text string;

analyze the extracted document content information and generate an intra document model for the PDF document comprising one or more combinations of PDF command and PDF data object used to position a text string;

evaluate the document content information in accordance with the intra document model;

identify one or more first artifacts in the document content information based on the evaluation in accordance with the intra document model, wherein the one or more first artifacts includes the presence of a first combination of PDF operator and PDF data object used to position a first text string in a set of text strings and the presence of a second combination of PDF command and PDF data object used to position a second text string in the same set of text strings;

determine an intra document score for the PDF document based on the identified one or more first artifacts;

evaluate the document content information in accordance with one or more inter document models, wherein an inter document model comprises a set of consistencies across a plurality of known PDF documents and includes a set of known combinations of PDF operator and PDF data object used by the particular third party to position a text string;

identify one or more second artifacts in the document content information based on the evaluation in accordance with the one or more inter document models, wherein the one or more second artifacts includes the presence of a second combination of PDF operator and PDF data object used to position a second text string not found in the set of known combinations of PDF operator and PDF data object used by the particular third party to position a text string included in the inter document model;

determine an inter document score for the PDF document based on the identified one or more second artifacts; and determine an alteration score for the PDF document based on the intra document score and the inter document score, wherein a fraud detection level is determined as high risk when the alteration score exceeds a predetermined threshold.

2. The method of claim 1, wherein the intra document model comprises a first data column having a first X location value corresponding to a horizontal position of a character in the PDF document, and wherein a first of the one or more first artifacts comprises a character in the first column of data having an X location value different from the first X location value.

3. The method of claim 2, wherein the character is one of a leftmost character in the first column, a decimal point, and a number adjacent a decimal point.

4. The method of claim 1, wherein the intra document model comprises a plurality of dates, wherein each of the plurality of dates has a date format, and wherein one of the one or more first artifacts comprises a first of the plurality of dates having a first date format and a second of the plurality of dates having a second date format.

5. The method of claim 1, wherein one of the one or more first artifacts comprises a font type or a font size, and wherein one of the one or more first artifacts comprises a contiguous string of characters including first and second characters having a different font type or a different font size.

6. The method of claim 1, wherein one of the one or more first artifacts comprises a contiguous string of characters including first and second characters having a different container type.

7. The method of claim 1, wherein the intra document model comprises a first data column and wherein one of the one or more first artifacts comprises one of first and second words in the data column having different container types, and first and second words in the data column having different container positioning commands.

8. The method of claim 1, wherein the intra document model comprises a sequence of data values having at least a first data value and a second data value and wherein one of the one or more first artifacts comprises a Y position of the second data value preceding a Y position of the first data value.

9. The method of claim 1, wherein the intra document model comprises a starting account balance, a plurality of transactions, and an ending account balance and wherein one of the one or more first artifacts comprises an ending account balance that does not agree with the starting account balance as modified by the plurality of transactions.

10. The method of claim 1, wherein one of the one or more first artifacts comprises one of a name of a software program used to generate the PDF document, an edit flag in the PDF document, and a first data object container positioned over second data object container.

11. The method of claim 1, wherein determining an intra document score comprises applying a weight to each of the one or more first artifacts, and wherein applying a weight to a first artifact comprises one of applying a first weight when a different artifact is present and applying a second weight when the different artifact is not present and applying a first weight when the first artifact is present one time and applying an increased weight for each additional time the first artifact is present.

12. The method of claim 1, wherein determining an inter document score comprises applying a weight to each of the one or more second artifacts, and wherein applying a weight to a second artifact comprises one of applying a first weight when a different artifact is present and applying a second weight when the different artifact is not present and applying a first weight when the second artifact is present one time and applying an increased weight for each additional time the second artifact is present.

13. The method of claim 1, wherein the intra document model comprises a first data column, wherein a plurality of rows of the first data column each have a different first X location value corresponding to a horizontal position of a character in the first data column of the PDF document.

14. The method of claim 13, wherein each of the plurality of different first X location values differ from each other.

15. The method of claim 14, wherein each of the plurality of different first X location values differ from each other by a same amount.

16. The method of claim 13, further comprising calculating a plurality of intra document alignment metrics, wherein a portion of the intra document alignment metrics comprise a first X location value corresponding to a horizontal position of a character in the first data column of the PDF document, further comprising determining an inter document score based on the identified one or more second artifacts and the plurality of intra document alignment metrics.

17. The method of claim 16, wherein the character is one of a leftmost character in the first column, a decimal point, and a number adjacent a decimal point.

* * * * *